United States Patent [19]

Anquetin

[11] 4,177,503
[45] Dec. 4, 1979

[54] DEVICE FOR LOCATING AND RETRIEVING METALLIC PARTS FROM DIFFICULT TO REACH AREAS

[76] Inventor: Jacques L. V. Anquetin, 7 rue de la Gouttiere, 78640 Neauphle le Chateau, France

[21] Appl. No.: 957,365

[22] Filed: Nov. 3, 1978

[30] Foreign Application Priority Data

Nov. 7, 1977 [FR] France .............................. 77 33449

[51] Int. Cl.² .............................................. F21V 1/00
[52] U.S. Cl. ................................... 362/236; 362/248; 362/249; 362/252; 362/278; 362/285; 362/311; 362/320; 362/356
[58] Field of Search .............. 362/248, 249, 252, 236; 362/278, 285, 311, 320, 356

[56] References Cited

U.S. PATENT DOCUMENTS

| 3,633,023 | 1/1972 | Castiglioni et al. ............. 362/249 X |
| 3,641,333 | 2/1972 | Gendron .......................... 362/250 X |
| 3,714,414 | 1/1973 | Sternius ............................... 362/249 |
| 3,755,663 | 8/1973 | George ............................... 362/249 |
| 3,970,837 | 7/1976 | Helm .................................. 362/249 |
| 4,107,767 | 8/1978 | Anquetin ....................... 362/249 X |

FOREIGN PATENT DOCUMENTS 1022902 3/1953 France .
2082172 12/1971 France .

*Primary Examiner*—Stephen J. Lechert, Jr.
*Attorney, Agent, or Firm*—Brisebois & Kruger

[57] ABSTRACT

A flexible strip with a series of electric bulbs contained in a cylindrical cavity of a portion of the length of the strip. A permanent magnet at one end of the strip facilitates picking up and retrieving metal parts from hard to reach areas. A pair of longitudinal conductors extend essentially the length of the strip, one of the conductors being sufficiently rigid to enable maintaining the strip in a configuration to which it is bent manually. A handle can be formed at the end of the strip opposite the magnet by inserting a rigid tube into a continuation of the cylindrical cavity.

4 Claims, 2 Drawing Figures

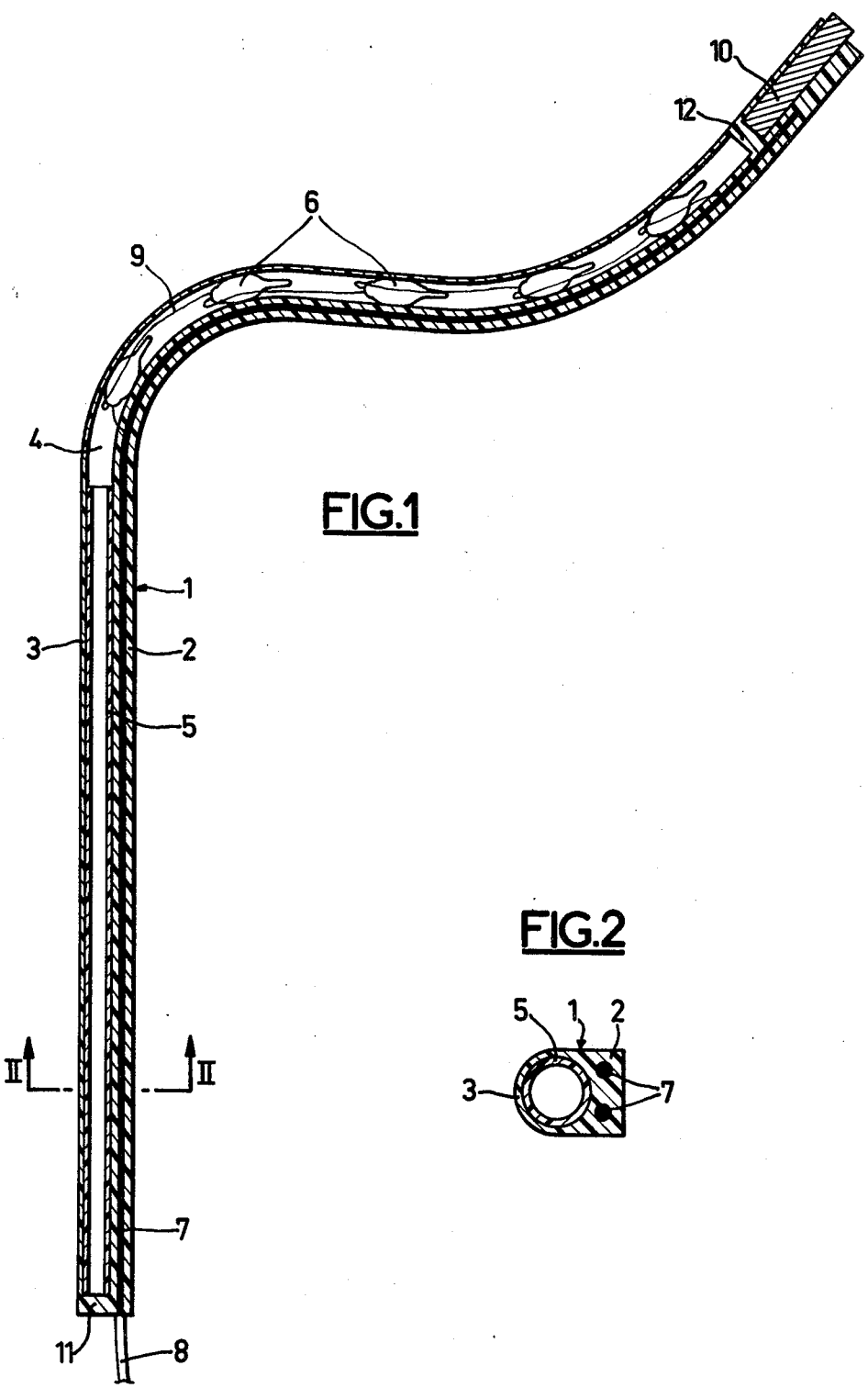

DEVICE FOR LOCATING AND RETRIEVING METALLIC PARTS FROM DIFFICULT TO REACH AREAS

BACKGROUND OF THE INVENTION

The present invention relates to a device permitting reaching into difficult places to recover small metallic parts of magnetic material such as iron or steel while also providing lighting in these places to facilitate locating and retrieval of the metallic parts even when the places are poorly lit or not lit at all.

Recovery of small metallic parts, for instance screws or nuts, which have fallen into places to which access is difficult, for example during repair work on automobile engines, poses problems both of lighting the places and of reaching into these places. Up to now, such parts were recovered by lighting the place or space as well as possible from the outside, for instance with a flashlight or a trouble lamp and by inserting into the place a tool which could be used to retrieve the part. However, where the place has a small opening or is deep, it is difficult to properly light the bottom of the place once the tool has been inserted.

SUMMARY OF THE INVENTION

The present invention relates to a device which eliminates this disadvantage and permits the easy locating and retrieval of metallic parts from places which are difficult to reach and poorly lit or not lit at all. The device comprises a section made of a length of transparent or translucent flexible plastic material, having a longitudinal cylindrical cavity enclosing along one portion of its length, a series of small electric bulbs distributed along the length of the section. These bulbs are energized at low voltage by two longitudinal electrical conductors embedded in the section, beside the cavity and by conductors interconnecting the bulbs and the two longitudinal conductors. The cylindrical cavity encloses, in the remainder of the length of the section, a cylindrical tube of rigid plastic material whose outside diameter is approximately equal to the diameter of the cavity. This same cylindrical cavity encloses, at an end remote from the plastic tube, a cylindrical permanent magnet whose diameter is approximately equal to the diameter of the cavity. Finally, at least one of the two longitudinal electrical conductors is sufficiently rigid to maintain in the part of the section located between the rigid tube and the magnet any bends or distortion made in this length of the section.

This device, which has a very small transverse section, thus consists of a rigid portion forming a handle followed by a flexible lighting portion which may be distorted or bent at will and which has a permanent magnet at its free end. When the device is held by the handle, the flexible portion can be inserted into restricted spaces which are poorly lit or even not lit at all, and the magnet can be used to recover metallic parts which have fallen into these spaces, the latter being lighted by the flexible portion of the device, thus facilitating the locating of the parts and their seizure by the magnet.

The following description of one illustrative and nonlimiting embodiment of a device according to the invention demonstrates other characteristics and advantages of the invention.

BRIEF DESCRIPTION OF THE DRAWINGS

FIG. 1 is a longitudinal section of a device according to the invention;

FIG. 2 is an enlarged view in section along II—II of FIG. 1, at the rigid handle of the device.

The device shown in FIG. 1 comprises, for example, a 50 cm long part of a section 1 made of transparent or translucent flexible plastic material. As FIG. 2 shows, this section 1 has, in transverse section, an approximately square rear portion 2 which merges into an approximately semi-cylindrical front portion 3. Section 1 has a longitudinal cylindrical cavity 4 located half in the rear portion 2 and half in the front portion 3.

The cylindrical cavity 4 encloses, along part of the length of section 1, from one of its ends, a rigid cylindrical tube 5 which can be made of plastic material and whose outside diameter is approximately equal to the diameter of cavity 4. Between the end of tube 5 located inside section 1 and the other end of cavity 4, the cavity encloses a series of small electric bulbs 6, for example there are five in the embodiment shown. These bulbs are distributed uniformly along the length of section 1 and are supplied with electricity by two parallel longitudinal electrical conductors 7, embedded in the rear portion of section 1, beside cavity 4. One of these conductors is flexible and the other is rigid. The flexible conductor could be a conventional multi-strand conductor and the rigid conductor a heavy, solid conductor or preferably a multi-strand conductor fixed to each other for example by tinning the entire conductor.

Conductors 7 which are bare inside section 1 exit at one side of the handle end in the form of a cord of two insulated conductors 8 permitting the device to be plugged into an electric current source such as a wall socket. Tap or branch conductors 9 interconnect the bulbs 6 and also connect them to the two longitudinal conductors 7. FIG. 1 shows that the conductors 7 terminate at a location spaced from the end of section 1 which is remote from the rigid handle.

At the aforecited remote end of section 1, cavity 4 encloses a permanent cylindrical magnet 10 whose diameter is approximately equal to that of cavity 4. The magnet 10 is so placed in cavity 4 as to protrude slightly beyond the free end of section 1.

FIG. 1 also shows that cavity 4 in section 1 is closed at the handle end by a sealed plug 11. In the same way, cavity 4 is sealed by a similar plug 12 at the inside end of magnet 10. Because of these two plugs 11 and 12 and because of the stub of the end of section 1 which does not have electrical conductors 7, the device is completely sealed.

This device could be made, for example, from a section of plastic material used to manufacture a flexible lighting strip enclosing electric light bulbs in a cylindrical cavity along its whole length. To facilitate the manufacture of the device, the rear portion of section 1 may be left empty up to the two conductors 7 and up to cavity 4 effectively along the whole width of the rear side of section 1. After bulbs 6 and conductors 7 and 9 are inserted, the cavity in the rear portion 2 of the section is filled with an electrically insulating mastic, as suggested for the flexible lighting strip according to U.S. Pat. No. 4,107,767.

The filling compound could be transparent or translucent. However, to avoid directing light into the eyes of the user of the device, it is better to use an opaque filling compound, so that the rear side of section 1 does not emit any light. Then the user has only to hold the device with the opaque rear side of section 1 towards him and will not be bothered by light emitted by the bulbs.

The filling compound is so chosen that it adheres equally well to the material of section 1 and to the insulating material on the conductors in connecting cord 8. Plugs 11 and 12 may be made of the same filling compound.

By way of example, section 1 could be made of a silicon rubber and the filling compound could be silicon mastic preferably one which is self-extinguishing.

Depending on the type of electric bulbs used, and on their connections, the series of bulbs may be supplied, for example, by a 110 or 220 volt local power supply or by a 6, 12 or 24 volt automobile power supply.

A device as described above and shown on the attached drawing can take on many modifications and variations within the scope of the present invention. Thus instead of having, in transverse section, an essentially square rear portion and an essentially semi-cylindrical front portion, section 1 could equally well have a different shape, being for example rectangular or oval.

Instead of using one flexible conductor and one solid or rigid conductor for the longitudinal conductors 7, it might be better to use two rigid tubular conductors. Actually in that case it is possible to connect the conductors of cord 8 to the conductors 7 by crimping them with a fastening clamp, although this is not possible with solid conductors which cannot be deformed enough to ensure a good hold for such a connection. Moreover, tubular conductors lend themselves better to flexion distortion than do solid conductors which tend to overheat under these conditions and to break more easily than tubular conductors.

It should also be noted that the rigid tube 5 inside section 1 could be replaced by a rigid tube threaded or strung over section 1 to form a rigid handle 4. This outside tube could be attached to section 1 with the same filling compound or mastic as is used to make plug 11.

What is claimed is:

1. A device for locating and retrieving metallic parts from places which are difficult to reach comprising, a section made of transparent or translucent flexible plastic material and having a longitudinal cylindrical cavity enclosing along part of its length from one end of the section, a series of small electric bulbs distributed along the length of the section and energized from two longitudinal electrical conductors embedded in the section beside said cavity, and by conductors connecting the bulbs to the two longitudinal conductors, said cavity enclosing, in the remainder of the length of the section, a cylindrical tube of rigid plastic material whose outside diameter is approximately equal to that of the cavity, said cylindrical cavity encloses, at an end of the section remote from the tube, a permanent cylindrical magnet whose diameter is approximately the same as that of the cavity, at least one of the two longitudinal electrical conductors being bendable but sufficiently rigid to maintain in the portion of the section located between the rigid tube and the magnet any bends formed in this portion of the section.

2. A device according to claim 1, wherein one of the two longitudinal electrical conductors is a flexible multi-strand conductor and the other is a solid rigid conductor.

3. A device according to claim 1, wherein one of the two longitudinal electrical conductors is a flexible, multi-strand conductor and the other is a multi-strand conductor whose strands are tinned to connect them together and make the conductor rigid.

4. A device according to claim 1, wherein the two longitudinal electrical conductors are hollow rigid conductors.

* * * * *